US011222484B2

(12) United States Patent
Kanbe et al.

(10) Patent No.: US 11,222,484 B2
(45) Date of Patent: Jan. 11, 2022

(54) MAINTENANCE NOTIFICATION SYSTEM AND METHOD FOR CONTROLLING SAME, AND NON-TRANSITORY COMPUTER READABLE MEDIUM

(71) Applicant: HONDA MOTOR CO., LTD., Tokyo (JP)

(72) Inventors: Yuta Kanbe, Wako (JP); Kimihiro Yonekawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 237 days.

(21) Appl. No.: 16/575,996

(22) Filed: Sep. 19, 2019

(65) Prior Publication Data

US 2020/0013237 A1 Jan. 9, 2020

Related U.S. Application Data

(63) Continuation of application No. PCT/JP2017/013511, filed on Mar. 31, 2017.

(51) Int. Cl.
*G07C 5/00* (2006.01)
*G06Q 10/00* (2012.01)
*G07C 5/08* (2006.01)

(52) U.S. Cl.
CPC ............ *G07C 5/006* (2013.01); *G07C 5/008* (2013.01); *G07C 5/0841* (2013.01)

(58) Field of Classification Search
USPC ........................................................ 701/29.1
See application file for complete search history.

(56) References Cited

U.S. PATENT DOCUMENTS

2010/0332475 A1* 12/2010 Birdwell ............... G06F 16/283
707/737
2014/0279707 A1* 9/2014 Joshua ............... G06Q 30/0283
705/400

(Continued)

FOREIGN PATENT DOCUMENTS

JP 2001-188992 A 7/2001
JP 2003-285724 A 10/2003

(Continued)

OTHER PUBLICATIONS

International Search Report for PCT/JP2017/013511 dated Jun. 20, 2017 (partially translated).
IPRP for PCT/JP2017/013511 dated Jul. 10, 2018.

*Primary Examiner* — Tyler D Paige
(74) *Attorney, Agent, or Firm* — Thomas | Horstemeyer, LLP

(57) ABSTRACT

A maintenance notification system estimates a state of a target vehicle that is subjected to maintenance on a basis of at least one of status information and drive history information of the target vehicle; estimates a tendency of maintenance by a user on a basis of the status information of the target vehicle; selects index information to be used for identifying a timing for maintenance of the target vehicle on a basis of at least one of the status information and the drive history information of the target vehicle, and identifies the timing for maintenance of the target vehicle and a content using the estimated state, the estimated tendency of maintenance by the user, and the selected index information; and provides a notification relating to the maintenance on a basis of the timing for the maintenance and the content.

14 Claims, 6 Drawing Sheets

(56) References Cited

U.S. PATENT DOCUMENTS

| | | | |
|---|---|---|---|
| 2015/0100504 A1* | 4/2015 | Binion | G06Q 30/0278 |
| | | | 705/306 |
| 2016/0025027 A1* | 1/2016 | Mentele | F02D 41/2429 |
| | | | 701/102 |
| 2016/0133070 A1 | 5/2016 | Ikeda | |
| 2018/0158145 A1* | 6/2018 | Weigel | G06Q 40/06 |
| 2018/0182187 A1* | 6/2018 | Tong | G06K 9/00791 |

FOREIGN PATENT DOCUMENTS

| | | |
|---|---|---|
| JP | 2004-272375 A | 9/2004 |
| JP | 2010-009123 A | 1/2010 |
| WO | 2015/132947 A1 | 9/2015 |
| WO | 2018/179307 A1 | 10/2018 |

* cited by examiner

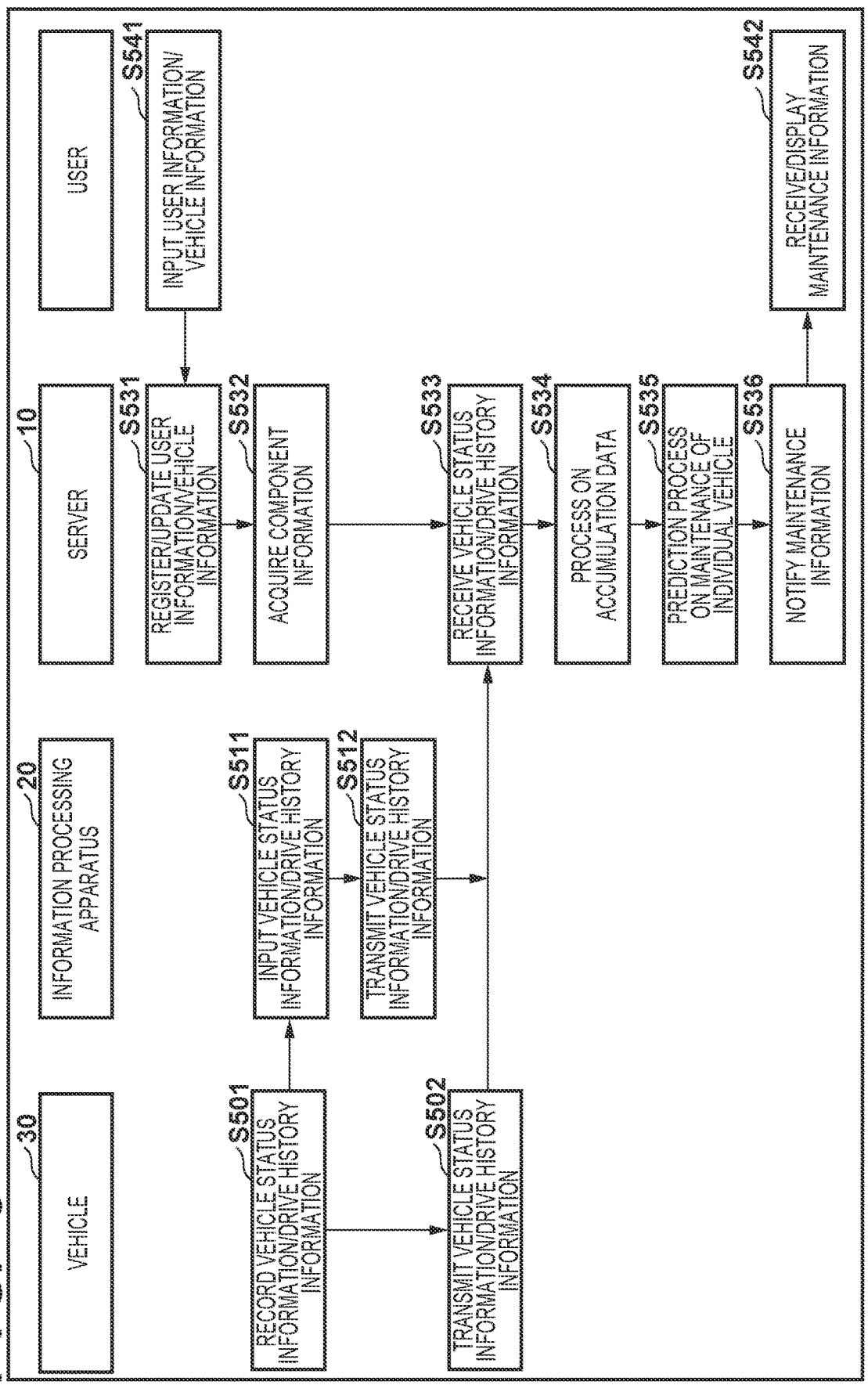

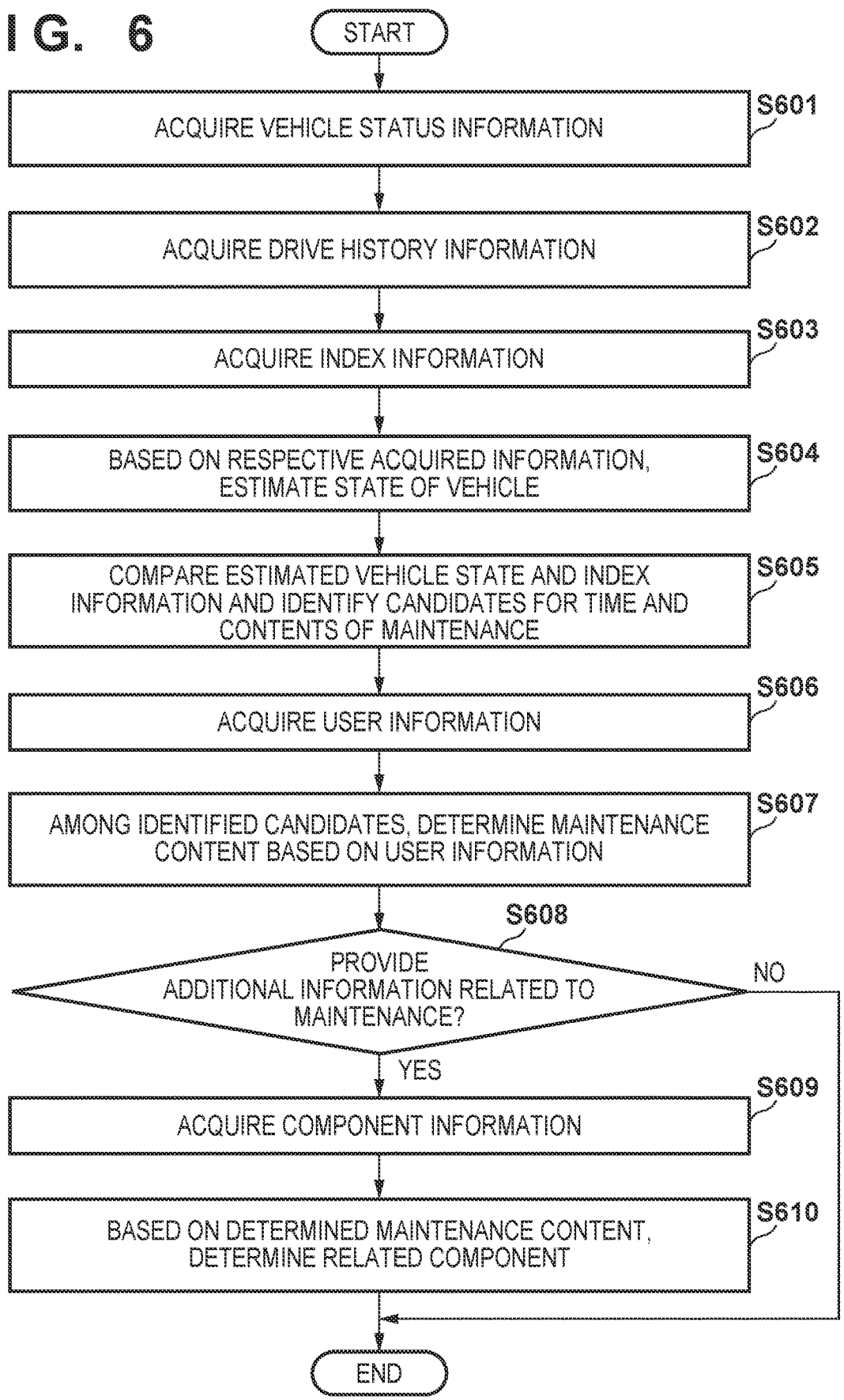

MAINTENANCE NOTIFICATION SYSTEM AND METHOD FOR CONTROLLING SAME, AND NON-TRANSITORY COMPUTER READABLE MEDIUM

CROSS-REFERENCE TO RELATED APPLICATION

This application is a continuation of International Patent Application No. PCT/JP2017/013511 filed on Mar. 31, 2017, the entire disclosures of which is incorporated herein by reference.

TECHNICAL FIELD

The present invention relates to a maintenance notification system, a method for controlling the same, and a non-transitory computer readable medium.

BACKGROUND ART

In the related art, an invention is disclosed in which vehicle data is accumulated, and its data and maintenance (failure repair) information are registered in a server to perform failure prediction for a driver having similar data (Patent Document 1, etc.,).

CITATION LIST

Patent Literature

Patent Document 1: Japanese Patent Laid-Open No. 2004-272375

SUMMARY OF INVENTION

Technical Problem

As disclosed in Patent Document 1, a technique is known in which failure prediction is performed, with use of data of a failed vehicle, by notifying a vehicle having similar data. However, the appropriate maintenance timing of the vehicle may differ depending not only on the data of the vehicle, but also on the driving characteristics of the driver (such as how the driving is performed).

In view of the foregoing, an object of the present invention is to provide a more accurate maintenance notification for the operator of the vehicle by determining an appropriate maintenance timing for the vehicle on the basis of the vehicle data and the operation information of a driver.

Solution to Problem

According to one aspect of the present invention, there is provided a maintenance notification system comprising: an accumulation unit configured to collect and accumulate status information of each of a plurality of vehicles, and drive history information of each of the plurality of vehicles; a generation unit configured to generate index information to be used for identifying a timing for maintenance with use of the information accumulated in the accumulation unit; a first estimating unit configured to estimate a state of a target vehicle that is subjected to the maintenance on a basis of at least one of the status information and the drive history information of the target vehicle; a second estimating unit configured to estimate a tendency of maintenance by a user of the target vehicle on a basis of the status information of the target vehicle; an identification unit configured to select index information to be used for identifying a timing for maintenance of the target vehicle from among the index information generated by the generation unit on a basis of at least one of the status information and the drive history information of the target vehicle, and identify the timing for maintenance of the target vehicle and a content using the state of the target vehicle estimated by the first estimating unit, the tendency of maintenance by the user of the target vehicle estimated by the second estimating unit, and the selected index information; and a notification unit configured to provide a notification relating to the maintenance on a basis of the timing for the maintenance and the content that are identified by the identification unit.

According to another aspect of the present invention, there is provided a method for controlling a maintenance notification system, the method comprising: collecting and accumulating status information of each of a plurality of vehicles, and drive history information of each of the plurality of vehicles; generating index information to be used for identifying a timing for maintenance with use of the information accumulated in the accumulating; estimating a state of a target vehicle that is subjected to the maintenance on a basis of the status information and the drive history information of the target vehicle; estimating a tendency of maintenance by a user of the target vehicle on a basis of the status information of the target vehicle; selecting index information to be used for identifying a timing for maintenance of the target vehicle from among the index information generated in the generating on a basis of at least one of the status information and the drive history information of the target vehicle, and identifying the timing for maintenance of the target vehicle and a content using the state of the target vehicle estimated in the first estimating, the tendency of maintenance by the user of the target vehicle estimated in the second estimating, and the selected index information; and providing a notification relating to the maintenance on a basis of the timing for the maintenance and the content that are identified in the identifying.

According to another aspect of the present invention, there is provided a non-transitory computer readable medium storing a program for causing a computer to function as: an accumulation unit configured to collect and accumulate status information of each of a plurality of vehicles, and drive history information of each of the plurality of vehicles; a generation unit configured to generate index information to be used for identifying a timing for maintenance with use of the information accumulated in the accumulation unit; a first estimating unit configured to estimate a state of a target vehicle that is subjected to the maintenance on a basis of the status information and the drive history information of the target vehicle; a second estimating unit configured to estimate a tendency of maintenance by a user of the target vehicle on a basis of the status information of the target vehicle; an identification unit configured to select index information to be used for identifying a timing for maintenance of the target vehicle from among the index information generated by the generation unit on a basis of at least one of the status information and the drive history information of the target vehicle, and identify the timing for maintenance of the target vehicle and a content using the state of the target vehicle estimated by the first estimating unit, the tendency of maintenance by the user of the target vehicle estimated by the second estimating unit, and the selected index information; and a notification unit configured to provide a notification relating to the maintenance on a basis of the timing for the maintenance and the content that are identified by the identification unit.

Advantageous Effects of Invention

According to the present invention, a more accurate maintenance notification for an operator of a vehicle can be provided.

Other features and advantages of the invention will become apparent from the following descriptions, with reference to the accompanying drawings. Note that, in the accompanying drawings, the same reference numerals are assigned to the identical or similar configurations.

BRIEF DESCRIPTION OF DRAWINGS

The accompanying drawings are included in the specification to constitute parts thereof and illustrate embodiments of the invention, and are used to explain the principles of the invention together with the description.

FIG. 5 is a sequence diagram of a system according to the present invention.

FIG. 6 is a flowchart illustrating processes in the server according to the present invention.

DESCRIPTION OF EMBODIMENTS

An embodiment of the present invention is described below with reference to the drawings. Note that the configurations and the like described below are merely examples, and the present invention is not limited to the configurations and the like described below.

First Embodiment

System Configuration

Figure 1:
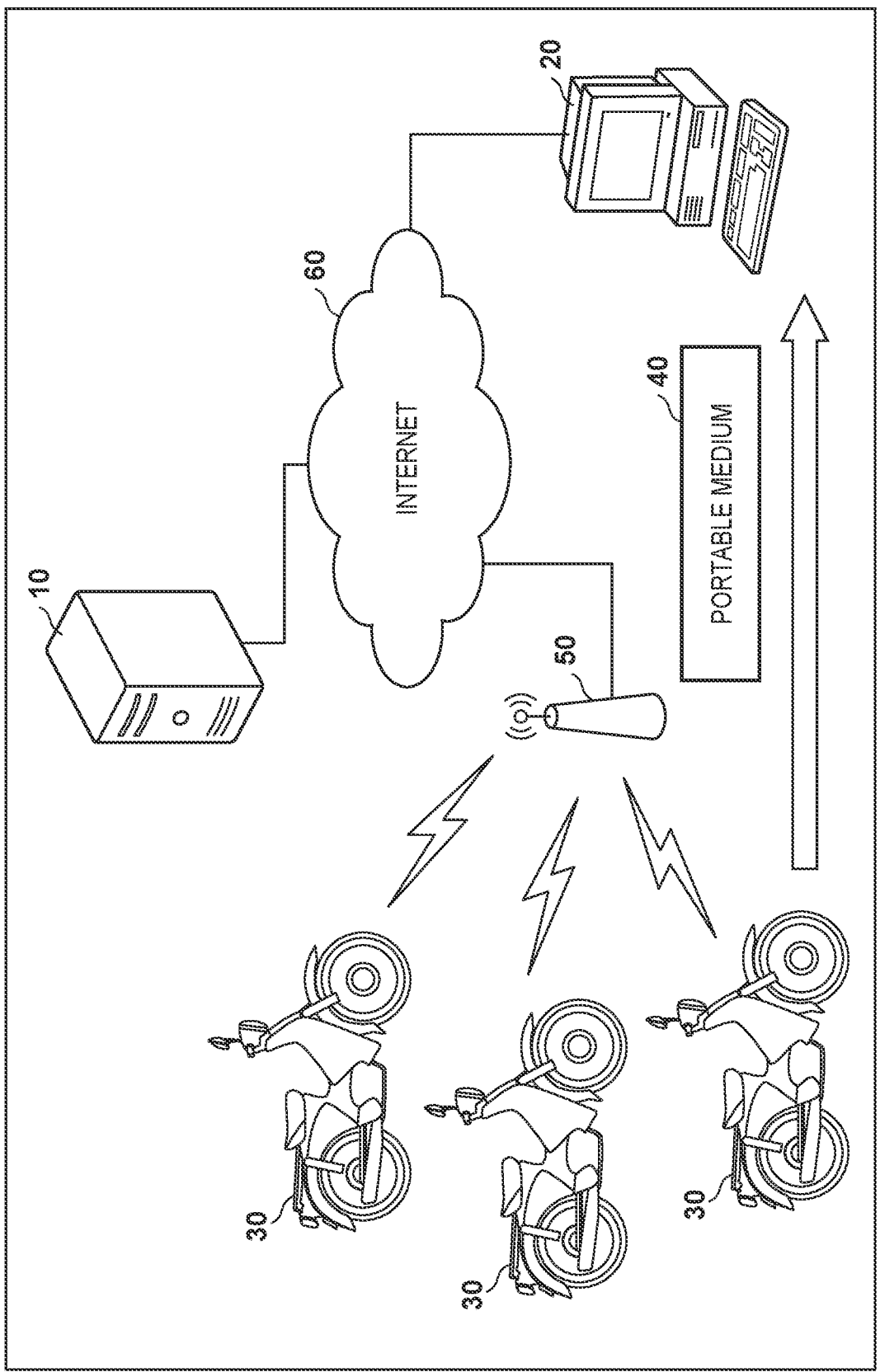
FIG. 1 illustrates an exemplary system configuration according to the present invention.

FIG. 1 illustrates an exemplary configuration of the entirety of a maintenance notification system according to the present embodiment. The maintenance notification system according to the present embodiment includes a server 10, an information processing apparatus 20, and a plurality of vehicles 30. The server 10 and the information processing apparatus 20 are communicatively connected via an Internet 60. In addition, vehicles 30 are also communicatively connected to the Internet 60 by wireless communication via an access point 50.

Note that, for the purpose of allowing wireless communication of the vehicle 30, the communication function may be achieved with an onboard terminal or a mobile terminal that can be carried by an operator of the vehicle 30. Here, the mobile terminal is, but not limited to, a device such as a smart phone and a tablet, and the mobile terminal may be another device. In addition, the vehicle 30 (or the mobile terminal) is configured so that various information is retained in a portable medium 40, and the information in the portable medium 40 can be provided to the information processing apparatus 20 and the like in addition to the communication via the access point 50. The information processing apparatus 20 is, for example, a commonly used computer such as a personal computer (PC), but the configuration thereof is not particularly limited. In the present embodiment, the vehicle 30 is described by taking an automatic two-wheel vehicle (so-called motorbike) as an example.

Note that, although only a single device for each of the devices other than the vehicles 30 is illustrated in FIG. 1, the configuration is not limited to this, and a plurality of the devices may be provided as necessary. In addition, the server 10 may be configured to perform distributed processing by a plurality of devices depending on functions and services rather than performing each process by a single device. The vehicle 30 is also not limited to the illustration of FIG. 1, and may include more vehicles, and their characteristics (such as the vehicle type, equipment and the like) may not be identical to each other.

Hardware Configuration

Figure 2:
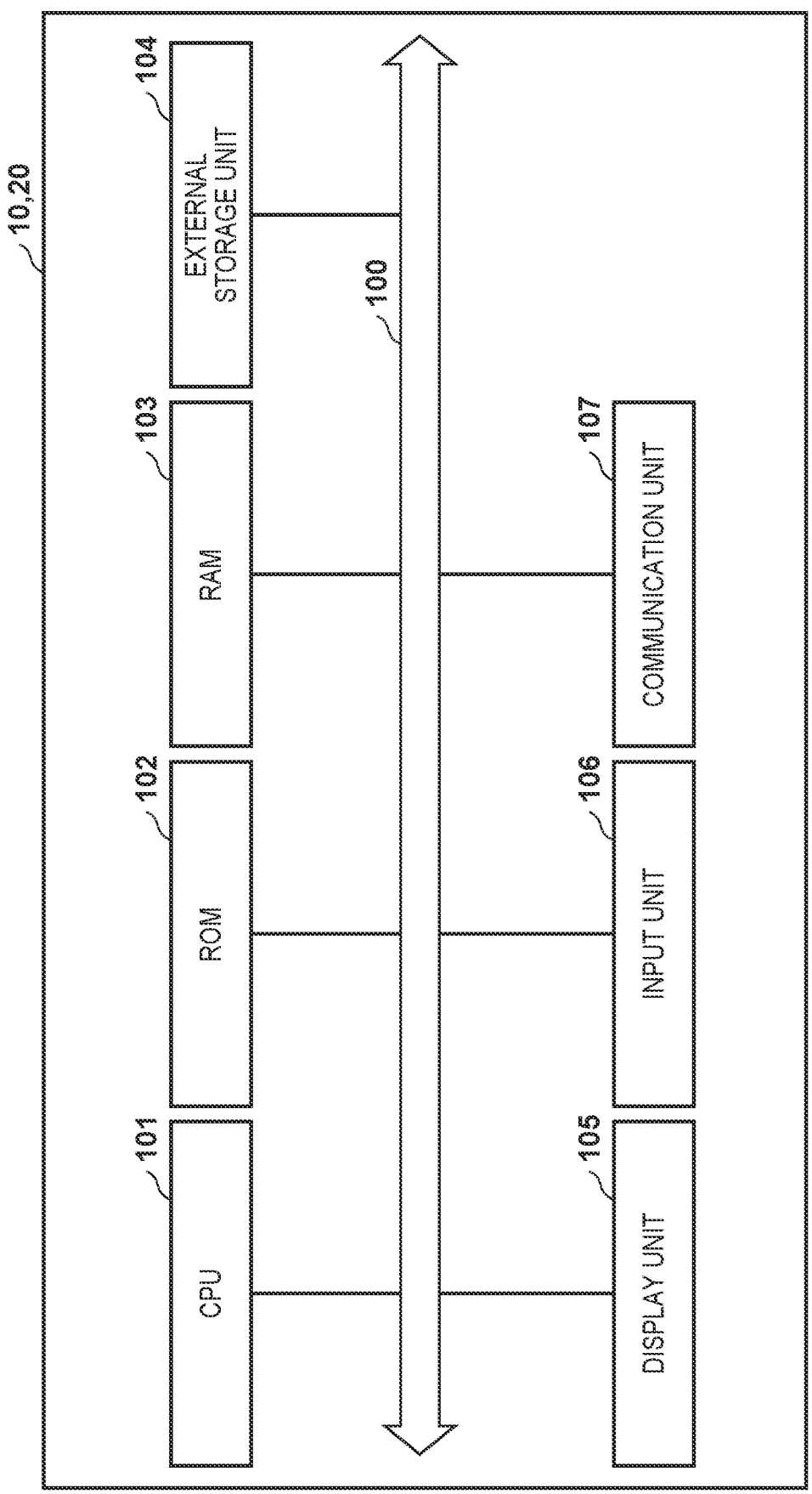
FIG. 2 illustrates an exemplary hardware configuration of a server and an information processing apparatus according to the present invention.

FIG. 2 illustrates an exemplary hardware configuration of the server 10 and the information processing apparatus 20 according to the present invention. Here, the hardware configuration of the server 10 and the hardware configuration of the information processing apparatus 20 are identical to each other, and therefore the server 10 will be described as an example.

The server 10 includes a CPU 101, a ROM 102, a RAM 103, an external storage unit 104, a display unit 105, an input unit 106, and a communication unit 107. The units are communicatively connected with each other via a bus 100.

The CPU 101 commands the entire control of the server 10, and implements processes and the like according to the present invention by reading and executing programs stored in the external storage unit 104 and the like. The ROM 102 is a non-volatile storage area and retains various programs and data. The RAM 103 is a volatile storage area, and is used as a work area in execution of a program, and the like. The external storage unit 104 is a non-volatile storage area, and retains various programs and data used for processes according to the present invention. The display unit 105 is a unit for displaying various screens. The input unit 106 is a unit for inputting various information and settings by a user or the like. The communication unit 107 is a unit configured to communicate with an external apparatus, and the communication method may be wired or wireless.

Figure 3:
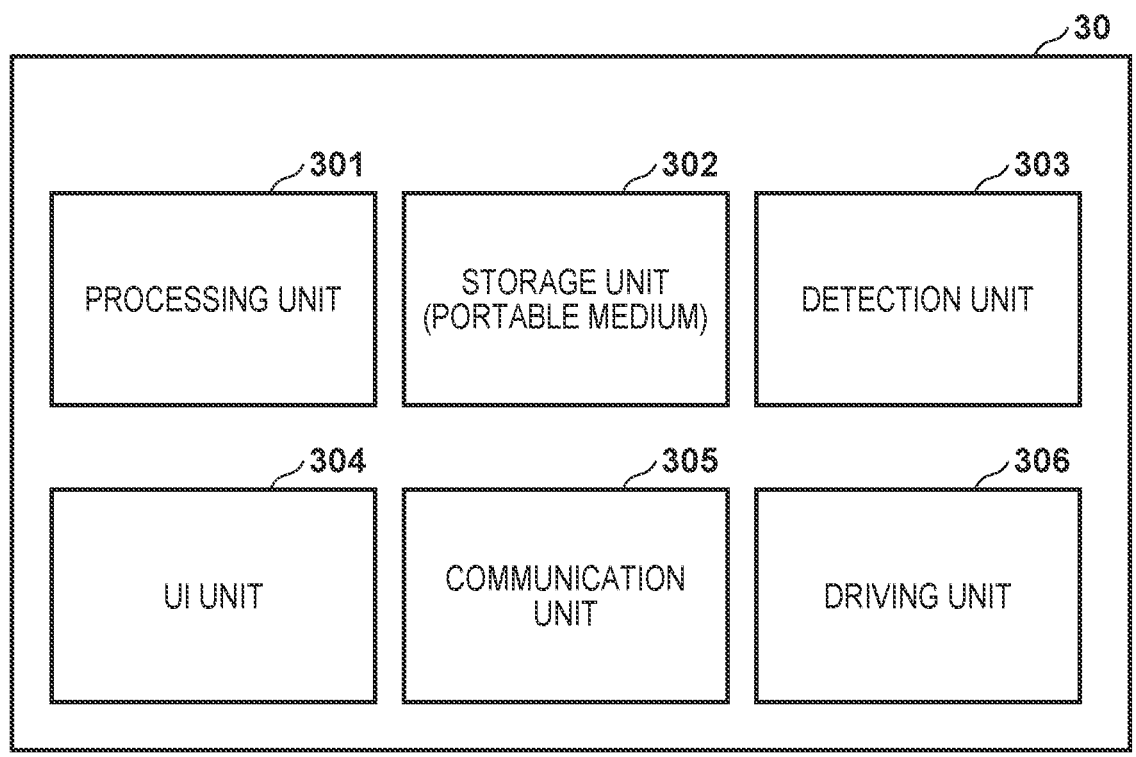
FIG. 3 illustrates an exemplary hardware configuration of a vehicle according to the present invention.

FIG. 3 illustrates an exemplary hardware configuration of the vehicle 30 according to the present invention. The vehicle 30 includes a processing unit 301, a storage unit 302, a detection unit 303, a UI unit 304, a communication unit 305, and a driving unit 306. The processing unit 301 commands the entire control of the processes according to the present embodiment. While the vehicle 30 is described by taking an automatic two-wheel vehicle as an example in the present embodiment as mentioned above, the control of travel and the like of the automatic two-wheel vehicle may be configured separately from the processes in the processing unit 301.

The storage unit 302 is a non-volatile storage area and retains various data according to the present embodiment. In the present embodiment, the storage unit 302 is configured as a portable medium that can be attached to and detached from the vehicle 30, and supports USB connections that allow for connection to the information processing apparatus 20 and the like, for example. The detection unit 303 is a detection means (sensor) for various operations included in the vehicle 30 according to the present embodiment, and its type, function, and detection method are not limited. Examples of information detected by the detection means include operations of the accelerator or brake, the remaining amount of fuel, tilt of the vehicle body, environmental information (air temperature, humidity and the like) during travel or stop, an impact on the vehicle body, an orientation of the handle, a state of a consumable (tire, fuel and the like), and the like. The information detected by the detection unit 303 may be retained in the storage unit 302 as raw data, or may be retained in the storage unit 302 after being processed as processing data by the processing unit 301.

The UI unit 304 is a unit for receiving various information and instructions from the user of the vehicle 30 and the like. The communication unit 305 is a unit configured to perform wireless communication with an external apparatus, and the communication method is not particularly limited. In addition, the data transmitted and/or received via the communication unit 305 and the communication timing are not particularly limited. The driving unit 306 is a unit configured to command driving and operation relating to the travel of the vehicle and the like. Note that the driving unit 306 includes parts such as the handle, brake and the like, and detailed description thereof is omitted here.

While the present embodiment describes a configuration in which the vehicle 30 includes the processing unit 301, the storage unit 302, the UI unit 304, or the communication unit 305, the present invention is not limited thereto. For example, the above-mentioned functions may be achieved using an on-board apparatus (a car navigation apparatus or the like), a mobile terminal such as a smart phone, and the like.

Software Configuration

Figure 4:
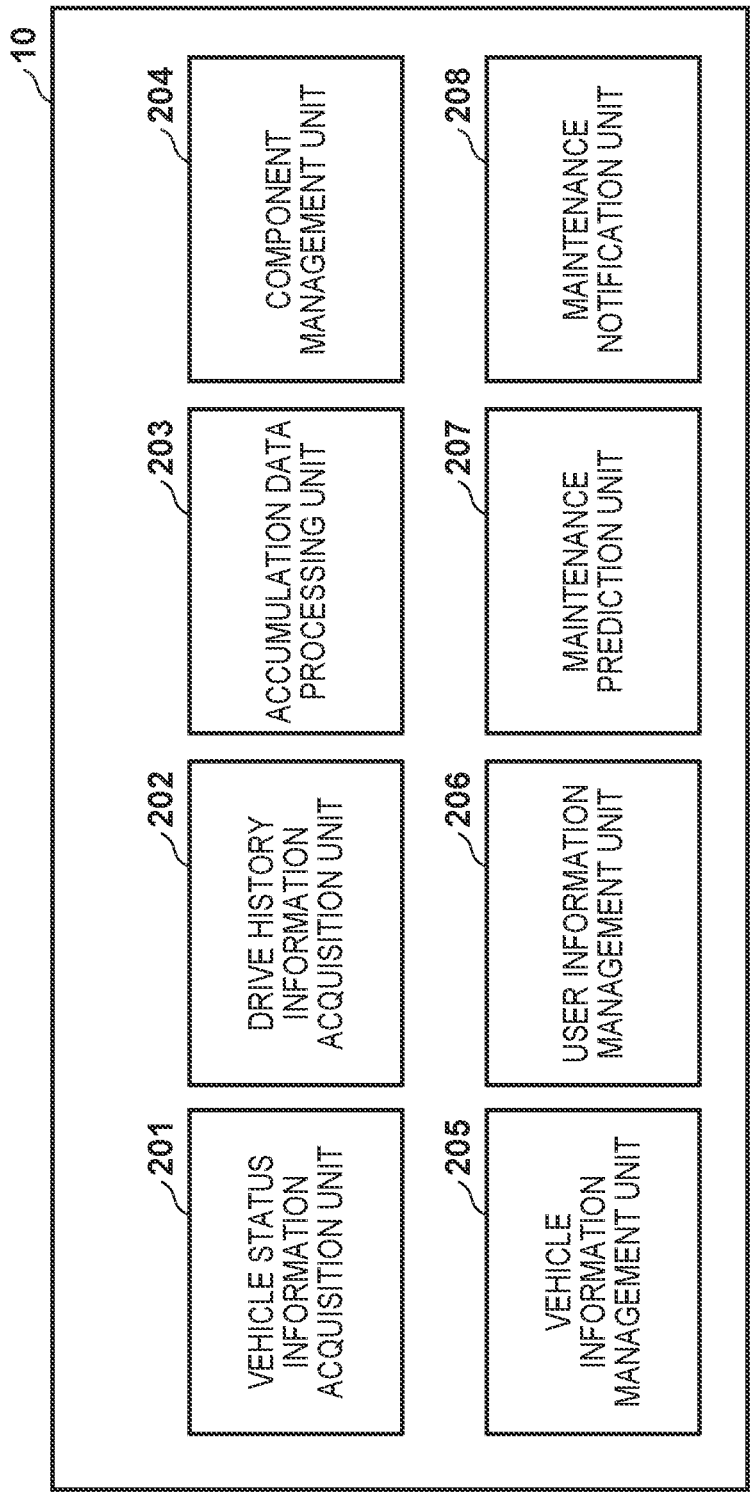
FIG. 4 illustrates an exemplary software configuration of the server according to the present invention.

FIG. 4 illustrates an exemplary software configuration of the server 10 according to the present invention. The server 10 includes a vehicle status information acquisition unit 201, a drive history information acquisition unit 202, an accumulation data processing unit 203, a component management unit 204, a vehicle information management unit 205, a user information management unit 206, a maintenance prediction unit 207, and a maintenance notification unit 208.

The vehicle status information acquisition unit 201 acquires vehicle status information from the vehicle 30 (or via the information processing apparatus 20). The vehicle status information indicates information relating to the components mounted on the vehicle 30 (which includes the time of replacement and/or the degree of wear), and/or information relating to the maintenance actually performed by the user managing the vehicle 30. Note that the information relating to the maintenance may include information relating to the timing and amount of oil supply. In addition, the provider of the information relating to maintenance here is not limited to the administrator (owner) of the vehicle 30, and may be a person in charge of a sales office who is contracted to perform the maintenance work, a factory for a vehicle inspection, and the like for example. In a case where information is acquired via the information processing apparatus 20, the vehicle status information acquisition unit 201 may provide an input screen as a Web application to the information processing apparatus 20 to receive input of data via the screen.

The drive history information acquisition unit 202 acquires drive history information from the vehicle 30 (or via the information processing apparatus 20). The drive history information indicates information relating to the history of driving performed by the user on the vehicle 30 (which includes the travelling route, travelling distance, driving frequency, operation history, and the like). In addition, the operation history may include control of the brake and accelerator, change of the gear, manipulation of the handle, change of the speed, tilt of the vehicle body, the continuous riding time, the weather during the driving, and the like. In a case where information is acquired via the information processing apparatus 20, the drive history information acquisition unit 202 may provide an input screen as a Web application to the information processing apparatus 20 to receive input of data via the screen.

The accumulation data processing unit 203 generates an index relating to the maintenance of the vehicle (and the components provided in the vehicle) on the basis of the accumulated data collected (acquired) from the plurality of vehicles 30. Here, the index includes a correlation between the operation history and the wear of the component, a determination criterion for identifying the type of the component suitable for the operation history, and the like. For example, the accumulation data processing unit 203 identifies and acquires, from the accumulated data, a history of maintenance performed by another user who has an identical or similar vehicle and is similar in the utilization purpose, frequency, and/or way of operation (tendencies in operation) of the vehicle. Then, on the basis of these pieces of information, the accumulation data processing unit 203 determines (generates) a criterion for determining a suitable maintenance time or target. Note that the method of determining the correlation and the method of determining the type of the component suitable for the operation history are not particularly limited, and may be determined by known statistical techniques, machine learning, deep learning, comparison with a predefined threshold (expiry date information and information relating to aging), and the like. In addition, the index is not limited to a single index, and multiple indices may be provided in accordance with the process to be performed on the accumulated data. In addition, the type of the accumulated data and the type of the index to be used may be designated by the user of the vehicle.

The component management unit 204 manages the information of each component that can be mounted on each vehicle. The component information includes, for example, the category (type), the performance and uses, the tendency of the degree of wear, the popularity, the price, the manufacturer, and the like of components. In addition, the component information is not limited to components such as tires, mirrors, and the like, and may include engine oil, fuel performance, and the like. In addition, the component information may be updated in accordance with information processed by the accumulation data processing unit 203, in addition to information provided by the manufacturer.

The vehicle information management unit 205 manages vehicle information for each vehicle. Here, the vehicle information includes information specific to the vehicle (the manufacturing number and/or the type of the vehicle) and the like. The vehicle information includes vehicle status information acquired by the vehicle status information acquisition unit 201, and drive history information acquired by the drive history information acquisition unit 202 of each vehicle.

The user information management unit 206 manages user information of the user who is the administrator of each vehicle. The user information may include the preferences, the information on the currently owned vehicle, and the information on the previously owned (or operated) vehicle of the user. Alternatively, information relating to a vehicle of interest may be included. The user information may include a content preset by the user, and may include notification destination information for the maintenance notification described later, for example.

The maintenance prediction unit 207 makes a prediction relating to maintenance on the vehicle 30 on the basis of the information managed by the component management unit 204, the vehicle information management unit 205, and the user information management unit 206, and an index processed by the accumulation data processing unit 203. For example, a component, a part, timing (time), and the like of maintenance are predicted, and details are described later.

The maintenance notification unit 208 notifies the user of maintenance information on the basis of the information predicted by the maintenance prediction unit 207. Here, the notification destination is indicated by the user information managed by the user information management unit 206. The method of the notification is, but not limited to, a mail, a letter, and the like.

Processing Sequence

FIG. 5 is a diagram illustrating a sequence of processes in the maintenance prediction system according to the present embodiment.

At S501, the vehicle 30 records the vehicle status information and the drive history information in a timely manner. Note that the recording of each information need not necessarily be performed at the same time, and the recording period and the timing of the recording may be different for each information. Regarding the timing of the recording, the recording may be performed at a predefined interval or may be performed when a predetermined operation (manipulation) is performed. For example, maintenance performed on the vehicle 30 side (e.g., a component has been replaced) may be detected and such information may be recorded.

At S502, the vehicle 30 transmits the recorded vehicle status information and the drive history information to the server 10. Note that the transmission of each information need not necessarily be performed at the same time, and only one of the information may be transmitted. Further, for the timing of the transmission, the transmission may be performed when a predetermined amount of data has been accumulated or at a timing when a predetermined period of time has elapsed after the last transmission. In addition, the information may be collectively transmitted at a timing when wireless communication is enabled, or may be transmitted in a divided manner.

At S511, the information processing apparatus 20 receives an input of the vehicle status information and the drive history information via an input from the user or an input through a connection of the portable medium 40.

At S512, the information processing apparatus 20 transmits each input information to the server 10. Note that the transmission history may be managed within the information processing apparatus 20. As described above, the server 10 may provide a screen (e.g., a screen by a Web application) for inputting each information to the information processing apparatus 20.

At S531, at an arbitrary timing, the server 10 receives an input and an update of the user information and the vehicle information from the user, and performs registration. The updating timing of the user information and the vehicle information is not particularly limited, and the user may perform the update as necessary.

At S532, the server 10 acquires component information. The component information may be acquired by acquiring information provided by an administrator of the server 10, manufacturer, or the like, or may be periodically acquired by communicating with an external server (not illustrated).

At S533, the server 10 acquires various information transmitted from the vehicle 30 or the information processing apparatus 20. The acquired information, in the vehicle information management unit 205, is retained in association with the vehicle 30, and also, is classified in accordance with the type of the information and retained as accumulated data.

At S534, the server 10 performs a process on the accumulated data. Specifically, with use of the accumulated data, the accumulation data processing unit 203 generates an index for use in determining the content and time of the maintenance. Note that this processing step is not limited to a process that is performed at a timing of reception of various information. For example, the process may be performed when a predetermined time has elapsed after the last process, or may be executed when an instruction is provided by the administrator of the server 10. It may also be executed when a predetermined amount of data is updated (added). That is, since data is successively collected from the plurality of vehicles and updated with time, the information (index) to be used in the maintenance prediction described later changes in accordance with the collection status and the processing status of the data.

At S535, the server 10 performs a prediction process relating to maintenance on a certain vehicle 30 (target vehicle) that is subject to the maintenance prediction on the basis of the various information of the vehicle 30 and the information (index) determined by the process performed at S533. Details of this process will be described later with reference to FIG. 6. This step may be performed independently of the execution timing of the process of S534, or may be performed at a predetermined time interval, or, may be performed upon receipt of various information at S532. The prediction process of the present embodiment also determines the timing (time) for the notification, in addition to the content of the maintenance.

At S536, the server 10 notifies the user of the maintenance information determined through the process of the S535. Here, the maintenance information is transmitted to the notification destination indicated by the user information associated with the information of the vehicle 30. For example, in a case where an email address is registered as a notification destination in the user information, the server 10 transmits an email containing maintenance information to the notification destination. Regarding the timing of this notification, the notification may be provided at an interval set by the user (e.g., once a day), whereas a highly urgent notification may be immediately provided.

At S541, at an arbitrary timing, the user inputs and updates the user information and the vehicle information. As described above, the updating timing of the user information and the vehicle information is not particularly limited and may be performed as necessary by the user. In addition, an input is performed in a timely manner when maintenance has been performed on the vehicle. In addition, a person who performs the input/update here is not necessarily limited to the administrator (owner) of the vehicle, and may be a dealer of the vehicle or the like. The input screen of each information may also be provided by the server 10 as an application (e.g., a Web application). In addition, in a case where maintenance is performed in response to the maintenance notification according to the present embodiment, the information thereof may be registered together.

At S542, the user receives the maintenance information notified from the server 10. For example, an email is received by a mobile terminal (not illustrated). Further, the user displays the received maintenance information.

Process Flow

Maintenance Prediction Process

The maintenance prediction process at the server 10 according to the present embodiment will be described below with reference to FIG. 6. The processing flow is implemented when, at the server 10, the CPU 101 reads and executes a program stored in the external storage unit 104 and the like. Note that the processing flow described below is an example, and the order may be changed as necessary.

At S601, the server 10 acquires, from the information managed by the vehicle information management unit 205, vehicle status information of the vehicle to be subjected to the maintenance prediction process. The information acquired here may only be the most recent information, or may include progress information in a predetermined range.

At S602, the server 10 acquires, from the information managed by the vehicle information management unit 205, the drive history information of the vehicle to be subjected to the maintenance prediction process.

At S603, the server 10 acquires the index information generated by the accumulation data processing unit 203 from the accumulated data. As the index information, only relevant information may be acquired using a predetermined item as a key from the vehicle status information and the drive history information of the vehicle.

At S604, the server 10 estimates the state of the vehicle on the basis of each acquired information. Here, regarding the state of the vehicle, the information indicated by the vehicle status information may be handled as the state of the vehicle as it is, or the state of a certain part (portion) or function may be estimated based on a plurality of items. For example, regarding a tire, the state (e.g., the degree of wear) of the tire may be estimated based on the time of the last replacement, the traveled distance, the utilization purpose of the vehicle of the user, and the operation tendency of the user. Further, in this step, the characteristics of the user operating the vehicle may be identified. For example, the utilization purpose of the vehicle may be inferred based on the travelling route and/or frequency indicated by the drive history information, and a change (such as improvement or decline) of the driving skill of the user may also be estimated. In addition, an expected value of the financial expense for the vehicle may be estimated by estimating the balance (money) for the vehicle of the user on the basis of the maintenance status, the replacement history of the components, and/or the like of the user in the past.

At S605, the server 10 determines candidates for the time and content of the maintenance for the vehicle on the basis of the state of the vehicle estimated at S604 and the index information acquired at S603. Here, the candidate is not limited to the same part (or component or consumable), and candidates for a plurality of maintenance contents, such as "supply brake oil" "within X days", and "replace tire" "within Y months", are determined.

At S606, the server 10 acquires, from the information managed by the user information management unit 206, the user information of the user of the vehicle to be subjected to the maintenance prediction process.

At S607, the server 10 determines, from among the candidates determined at S606, the content of the maintenance to be provided to the user at this point in time on the basis of the user information. For example, the content of highly urgent maintenance may be always notified, and the priority of the notification for a portion maintained by the user last time may be lowered such that a higher priority is assigned to other notifications. In addition, in the case where a setting in which the user does not use the vehicle for some period of time has been made at this point in time, the notification may not be provided.

At S608, the server 10 determines whether to provide additional information relating to the determined content of the maintenance. Here, the determination may be based on, for example, the setting set by the user or the content of the maintenance. The present embodiment describes an exemplary case where information on a component that is usable (replaceable) for the maintenance is provided as additional information. In accordance with a determination that additional information is provided (YES at S608), the process proceeds to S609. In accordance with a determination that additional information is not provided (NO at S608), this processing flow is terminated.

At S609, the server 10 acquires the component information managed by the component management unit 204. Here, the information to be acquired may be determined in accordance with the content of the maintenance and the user information. For example, when the maintenance of a tire is specified to be required at S605, information on the tire (e.g., product name, sales office, and performance information) is acquired.

At S610, from the acquired component information, the server 10 determines information to be provided together with the maintenance information. For example, the information of a suitable component is determined in accordance with the preferences of the user set in the user setting, the estimated user characteristics (skill level, utilization purpose), and the like, for example. In addition, a user whose characteristics are identical or similar to the estimated characteristics of the user may be identified based on the accumulated data so as to determine the component used by the identified user as a recommended component. Thereafter, this processing flow is terminated.

Exemplary Information According to the Present Embodiment

An example of information handled by the system according to the present embodiment will be described. As described above, in the present embodiment, the vehicle status information and the drive history information of the own vehicle are used for providing a maintenance notification relating to the vehicle. Further, information relating to the components, and information (index) acquired by processing the vehicle status information and the drive history information collected from a source other than the own vehicle are used.

Examples of the vehicle status information are as follows: The replacement history of each component, the type and performance of mounted components, the timing and number of times of refueling, and the like.

Examples of the drive history information are as follows: The operation history of the accelerator and brake, the number of changes of the gear, tilt of the vehicle body, the posture during operation, the movement of the center of gravity during operation, the number of times of operations, the operation time, the travelled distance, whether an accident (impact and/or vibration) has occurred, the frequency of operation, the time interval between the last operation and the next operation, the traveling location, the traveling position on the road, and the like.

Examples of the index information include categorization for identifying the tendency in driving of the driver on the basis of the drive history information of the operator. For example, the operator is categorized into a plurality of categories such as category A (safety-oriented driving), category B (speed-oriented driving), and category C (road rage-oriented driving). Here, the accumulated data is processed to generate a plurality of categories from the operation history. The categories of the categorization may be given in advance by a person or may be automatically generated. Further, the tendencies of maintenance, the components to be used, and the like are determined from the accumulated data in association with each category. Thus, the appropriate maintenance time, recommended component, and/or the like for the user to be subjected to the maintenance prediction can be identified on the basis of the operation tendencies and index information of the user.

In light of the above, the index information may be information such as "when the degree of wear of a consumable component A (e.g., a tire) is estimated to be X % for a user having a tendency (category A), the user is recommended to replace the component within Y days". In addition, the information may be information such as "when Z months or more have passed since the last operation, replacement of a component W is recommended". In addition, as the index information, it is possible to use similarity in operation tendencies in the categorization such as "the operational characteristics of a user whose braking frequency tends to be higher than the acceleration frequency by a predetermined ratio or more are categorized as category C".

The component information includes the performance, function, manufacturer, and the like of components. Note that, since the content to be notified is not limited to the components in the maintenance notification, the information to be managed may be changed in accordance with the content of notification such as the content of service, for example.

As described above, according to the present embodiment, by determining an appropriate maintenance timing for the vehicle on the basis of the vehicle data and the operation information of the driver, it is possible to provide a more accurate maintenance notification for the operator of the vehicle.

Second Embodiment

In the first embodiment, the notification destination of the maintenance information is the user (administrator) of the vehicle set as the notification destination in the user information. The present invention is not limited to such a configuration, and the notification may be provided also to other predetermined notification destinations (information sharing). For example, the notification may be provided also to the manufacturer of the vehicle, and the factory, sales office, and the like where maintenance can be performed. In this case, the maintenance information and/or user information (such as preferences) of the past may also be provided together.

In addition, the notification may be provided to, as a notification destination, a store used by another user who is highly similar to the user on the basis of the operation tendencies, frequency, and the like of the user in addition to the notification destination registered by the user.

Further, the notification destination that has received the notification may provide, with use of the information thereof, additional services relating to the maintenance (e.g., provision of tailored component information, efficiency enhancement in a reservation process for maintenance schedules and the like).

Thus, not only the user of the vehicle, but also other related persons can acquire the information on components and the like relating to the maintenance, and thus the maintenance efficiency can be increased. In addition, information based on the operation history and the operation tendencies of the vehicle can be shared, and thus the convenience of the user can be increased.

Other Embodiments

While the maintenance is performed in accordance with the wear of the component and the like in the embodiment described above, the present invention is not limited thereto. For example, maintenance information in accordance with the license class and/or the accident history may be provided. In addition, the notification content may be switched in consideration of whether the user performs the maintenance by oneself in consideration of the ratio of the frequency of the maintenance performed by the user by oneself and the frequency of the maintenance performed by a person other than the user in a place such as a factory. Further, the notification content may be switched by estimating not only the tendency in operation, but also the tendency in maintenance (maintenance skill) on the basis of the above-mentioned information. For example, for a user who does not frequently rides on the vehicle but highly frequently performs maintenance (e.g., modifications, and the like), a notification in accordance with the details thereof may be provided.

Information on a budget that can be spent by the user on the vehicle may be received in advance to provide information on components on the basis of the received information.

In addition, in consideration of a predetermined period of time, such as the period of the vehicle inspection or the compulsory automobile liability insurance, the maintenance information may not be sent, or may be sent when the period is close to that period.

In addition, in the case where the vehicle is a secondhand vehicle (a vehicle whose owner has been changed multiple times), the history of the vehicle itself may be passed on to a new user on the basis of the vehicle identification number and the like.

In addition, communication between vehicles may be performed such that the drive history information includes the frequency of communication, the travelling spacing (the distance between vehicles) and the like.

While information is shared with a manufacturer, a maintenance factory, and the like as an example in the second embodiment, it is possible to adopt a configuration of operating in conjunction with an EC site for Internet shopping, for example. This case corresponds to a configuration of providing information on various products from an EC site together with the operation history, preferences, and tendencies in operation of the user.

SUMMARY OF EMBODIMENTS

1. A maintenance notification system (e.g., 10) according to the above-mentioned embodiment including:
an accumulation unit (e.g., 201, 202, 205) configured to collect and accumulate status information of each of a plurality of vehicles, and drive history information of each of the plurality of vehicles;
a generation unit (e.g., 203) configured to generate index information to be used for predicting a timing for maintenance with use of the information accumulated in the accumulation unit;
an identification unit (e.g., 207) configured to identify a timing for maintenance on a target vehicle that is subjected to the maintenance on a basis of the status information and the drive history information of the target vehicle and the index information generated by the generation unit; and a notification unit (e.g., 208) configured to provide a notification relating to the maintenance on a basis of the timing for the maintenance that is identified by the identification unit.

According to this embodiment, a more accurate maintenance notification for the user of the vehicle can be provided.

2. In the maintenance notification system according to the above-mentioned embodiment, the status information includes a history of maintenance performed on a vehicle; and the generation unit generates index information for estimating a degree of wear of a component provided in the vehicle on a basis of the drive history information and the history of the maintenance performed on the vehicle.

According to this embodiment, a more accurate maintenance notification reflecting the history of maintenance can be provided.

3. In the maintenance notification system according to the above-mentioned embodiment, the generation unit generates one or more pieces of index information for performing categorization into a plurality of categories corresponding to a tendency in operation of a user on a basis of the drive history information.

According to this embodiment, a maintenance notification can be provided in accordance with the characteristic of the operation of the user.

4. In the maintenance notification system according to the above-mentioned embodiment, the identification unit identifies a user having an identical or similar tendency in operation to that of a user of the target vehicle on a basis of the drive history information and the index information.

According to this embodiment, a maintenance notification can be received based on another user whose information is identical or similar to the user.

5. In the maintenance notification system according to the above-mentioned embodiment, the identification unit identifies the timing for the maintenance on the target vehicle on a basis of a history of maintenance performed by the user having the identical or similar tendency in operation.

According to this embodiment, a maintenance notification can be received based on another user whose information is identical or similar to the user.

6. In the maintenance notification system according to the above-mentioned embodiment, the accumulation unit collects the status information and the drive history information from each of the plurality of vehicles via an Internet (e.g., 60).

According to this embodiment, a greater amount of data for use in maintenance notification can be collected via an external network.

7. In the maintenance notification system according to the above-mentioned embodiment, the status information includes information on whether a response to the notification relating to the maintenance has been made.

According to this embodiment, a result of a response of the user to a maintenance notification can be collected, and additional maintenance notifications reflecting the information thereof are achieved.

8. In the maintenance notification system according to the above-mentioned embodiment, the identification unit switches the index information for use in identifying the timing for the maintenance in accordance with a setting set by a user.

According to this embodiment, maintenance notifications in accordance with the intention of the user may be provided.

9. In the maintenance notification system according to the above-mentioned embodiment, the identification unit further identifies information of a component associated with the maintenance on a basis of the status information and the drive history information of the target vehicle (e.g., 204); and the notification unit further notifies the identified information of the component.

According to this embodiment, maintenance notifications that are more convenient for the user can be provided.

10. In the maintenance notification system according to the above-mentioned embodiment, the notification unit further notifies information relating to the maintenance to a notification destination other than a user of the target vehicle on a basis of the status information and the drive history information of the target vehicle.

According to this embodiment, information relating to maintenance can be shared by a user or the like other than the user of the vehicle.

11. A method for controlling a maintenance notification system according to the above-mentioned embodiment, the method including:

collecting and accumulating status information of each of a plurality of vehicles, and drive history information of each of the plurality of vehicles;

generating index information to be used for predicting a timing for maintenance with use of the information accumulated in the accumulating;

identifying a timing for maintenance on a target vehicle that is subjected to the maintenance on a basis of the status information and the drive history information of the target vehicle and the index information generated in the generating; and providing a notification relating to the maintenance on a basis of the timing for the maintenance that is identified in the identifying.

According to this embodiment, a more accurate maintenance notification for the user of the vehicle can be provided.

12. A program according to the above-mentioned embodiment is configured for functioning a computer as:

an accumulation unit configured to collect and accumulate status information of each of a plurality of vehicles, and drive history information of each of the plurality of vehicles;

a generation unit configured to generate index information to be used for predicting a timing for maintenance with use of the information accumulated in the accumulation unit;

an identification unit configured to identify a timing for maintenance on a target vehicle that is subjected to the maintenance on a basis of the status information and the drive history information of the target vehicle and the index information generated by the generation unit; and a notification unit configured to provide a notification relating to the maintenance on a basis of the timing for the maintenance that is identified by the identification unit.

According to this embodiment, a more accurate maintenance notification for the user of the vehicle can be provided.

The present invention is not limited to the embodiments described above, and various modifications and variations can be made without departing from the spirit and scope of the present invention. Accordingly, the following claims are appended to disclose the scope of the invention.

The invention claimed is:

1. A maintenance notification system comprising:

an accumulation unit configured to collect and accumulate status information of each of a plurality of vehicles, and drive history information of each of the plurality of vehicles, the status information including information relating to a maintenance history for each of the plurality of vehicles;

a generation unit configured to generate index information to be used for identifying a timing for maintenance with use of the information accumulated in the accumulation unit, the index information including a correlation between the drive history information and wear of a vehicle component;

a first estimating unit configured to estimate a state of a target vehicle that is subjected to the maintenance on a basis of at least one of the status information and the drive history information of the target vehicle;

a second estimating unit configured to estimate a tendency of maintenance by a user of the target vehicle on a basis of the status information of the target vehicle;

an identification unit configured to select index information to be used for identifying a timing for maintenance of the target vehicle from among the index information generated by the generation unit on a basis of at least one of the status information and the drive history information of the target vehicle, and identify the timing for maintenance of the target vehicle and a content using the state of the target vehicle estimated by the first estimating unit, the tendency of maintenance by the user of the target vehicle estimated by the second estimating unit, and the selected index information; and a notification unit configured to provide a notification relating to the maintenance on a basis of the timing for the maintenance and the content that are identified by the identification unit, wherein a content of the notification is switched in accordance with a ratio of a maintenance frequency by the user him/herself and a maintenance frequency by a person other than the user such as a factory person.

2. The maintenance notification system according to claim 1, wherein the generation unit generates one or more pieces of index information for performing categorization into a plurality of categories corresponding to a tendency in operation of a user on a basis of the drive history information.

3. The maintenance notification system according to claim 1, wherein the identification unit identifies a user having an identical or similar tendency in operation to that of a user of the target vehicle on a basis of the drive history information and the index information.

4. The maintenance notification system according to claim 3, wherein the identification unit identifies the timing for the maintenance on the target vehicle on a basis of a history of maintenance performed by the user having the identical or similar tendency in operation.

5. The maintenance notification system according to claim 1, wherein that the accumulation unit collects the status information and the drive history information from each of the plurality of vehicles via an Internet.

6. The maintenance notification system according to claim 1, wherein the status information includes information on whether a response to the notification relating to the maintenance has been made.

7. The maintenance notification system according to claim 1, wherein the identification unit switches the index information for use in identifying the timing for the maintenance in accordance with a setting set by a user.

8. The maintenance notification system according to claim 1, wherein the identification unit further identifies information of a component associated with the maintenance on a basis of the status information and the drive history information of the target vehicle; and the notification unit further notifies the identified information of the component.

9. The maintenance notification system according to claim 1, wherein the notification unit further notifies information relating to the maintenance to a notification destination other than a user of the target vehicle on a basis of the status information and the drive history information of the target vehicle.

10. The maintenance notification system according to claim 1, wherein the notification unit requests, by notifying a notification destination capable of the maintenance of the notification relating to the maintenance, a reservation process of maintenance at the notification destination.

11. The maintenance notification system according to claim 1, wherein a timing and content of the notification relating to the maintenance are controlled on a basis of at least one of accident history of a user of the target vehicle, license information, insurance information of the target vehicle, vehicle inspection information of the target vehicle, or information of a previous user of the target vehicle.

12. The maintenance notification system according to claim 1, wherein the notification unit requests, by notifying a notification destination that can provide a component available for the maintenance of the notification relating to the maintenance, so as to provide, to a user of the target vehicle, information regarding the component available for the maintenance that can be provided by the notification destination.

13. A method for controlling a maintenance notification system, the method comprising:

collecting and accumulating status information of each of a plurality of vehicles, and drive history information of each of the plurality of vehicles, the status information including information relating to a maintenance history for each of the plurality of vehicles;

generating index information to be used for identifying a timing for maintenance with use of the information accumulated in the accumulating, the index information including a correlation between the drive history information and wear of a vehicle component;

estimating a state of a target vehicle that is subjected to the maintenance on a basis of the status information and the drive history information of the target vehicle;

estimating a tendency of maintenance by a user of the target vehicle on a basis of the status information of the target vehicle;

selecting index information to be used for identifying a timing for maintenance of the target vehicle from among the index information generated in the generating on a basis of at least one of the status information and the drive history information of the target vehicle, and identifying the timing for maintenance of the target vehicle and a content using the state of the target vehicle estimated in the first estimating, the tendency of maintenance by the user of the target vehicle estimated in the second estimating, and the selected index information; and providing a notification relating to the maintenance on a basis of the timing for the maintenance and the content that are identified in the identifying, wherein a content of the notification is switched in accordance with a ratio of a maintenance frequency by the user him/herself and a maintenance frequency by a person other than the user such as a factory person.

14. A non-transitory computer readable medium storing a program for causing a computer to function as:
- an accumulation unit configured to collect and accumulate status information of each of a plurality of vehicles, and drive history information of each of the plurality of vehicles, the status information including information relating to a maintenance history for each of the plurality of vehicles;
- a generation unit configured to generate index information to be used for identifying a timing for maintenance with use of the information accumulated in the accumulation unit, the index information including a correlation between the drive history information and wear of a vehicle component;
- a first estimating unit configured to estimate a state of a target vehicle that is subjected to the maintenance on a basis of the status information and the drive history information of the target vehicle;
- a second estimating unit configured to estimate a tendency of maintenance by a user of the target vehicle on a basis of the status information of the target vehicle;
- an identification unit configured to select index information to be used for identifying a timing for maintenance of the target vehicle from among the index information generated by the generation unit on a basis of at least one of the status information and the drive history information of the target vehicle, and identify the timing for maintenance of the target vehicle and a content using the state of the target vehicle estimated by the first estimating unit, the tendency of maintenance by the user of the target vehicle estimated by the second estimating unit, and the selected index information; and
- a notification unit configured to provide a notification relating to the maintenance on a basis of the timing for the maintenance and the content that are identified by the identification unit,
- wherein a content of the notification is switched in accordance with a ratio of a maintenance frequency by the user him/herself and a maintenance frequency by a person other than the user such as a factory person.

* * * * *